US009071342B1

(12) United States Patent
Jin et al.

(10) Patent No.: US 9,071,342 B1
(45) Date of Patent: Jun. 30, 2015

(54) METHOD AND APPARATUS FOR CORRELATING GLOBAL POSITIONING SYSTEM (GPS) PSEUDORANDOM NOISE (PRN) CODES

(75) Inventors: Xiangdong Jin, Mountain View, CA (US); Mao Yu, San Jose, CA (US); Chi-Yuen Young, Hong Kong (HK)

(73) Assignee: MARVELL INTERNATIONAL LTD., Hamilton (BM)

( * ) Notice: Subject to any disclaimer, the term of this patent is extended or adjusted under 35 U.S.C. 154(b) by 605 days.

(21) Appl. No.: 13/081,746

(22) Filed: Apr. 7, 2011

Related U.S. Application Data

(60) Provisional application No. 61/322,243, filed on Apr. 8, 2010.

(51) Int. Cl.
*H04B 1/709* (2011.01)
*G01S 19/30* (2010.01)

(52) U.S. Cl.
CPC ............. *H04B 1/709* (2013.01); *G01S 19/30* (2013.01)

(58) Field of Classification Search
CPC ....... G01S 19/215; G01S 19/22; G01S 19/37; G01S 19/426; G01S 19/30; H04B 1/709; H04B 1/7085; H04B 1/70735; G06F 7/02; H04L 7/0742; H04L 7/043
USPC ........ 375/150, 130.14, 148, 149; 342/357.12, 342/357.63
See application file for complete search history.

(56) References Cited

U.S. PATENT DOCUMENTS

| | | | | |
|---|---|---|---|---|
| 5,414,729 A | * | 5/1995 | Fenton | 375/149 |
| 5,592,518 A | * | 1/1997 | Davis et al. | 375/368 |
| 5,734,674 A | * | 3/1998 | Fenton et al. | 375/150 |
| 5,883,921 A | * | 3/1999 | Andren et al. | 375/150 |
| 6,148,313 A | * | 11/2000 | Freidin et al. | 708/422 |
| 6,298,083 B1 | * | 10/2001 | Westcott et al. | 375/150 |
| 6,546,040 B1 | * | 4/2003 | Eschenbach | 375/140 |
| 8,390,513 B2 | * | 3/2013 | Young | 342/357.77 |
| 2007/0010212 A1 | * | 1/2007 | Torimoto et al. | 455/95 |
| 2007/0064777 A1 | * | 3/2007 | Gunzelmann et al. | 375/150 |
| 2007/0210958 A1 | * | 9/2007 | Van Wechel et al. | 342/357.12 |
| 2009/0079627 A1 | * | 3/2009 | Sun et al. | 342/357.12 |
| 2012/0281734 A1 | * | 11/2012 | Sun et al. | 375/149 |

OTHER PUBLICATIONS

Won Namgoong et al ("Power consumption of parallel spread spectrum correlator Architectures", Low Power Electronics and Design, 1998. Proceedings. 1998 International Symposium (IEEE Cat. No. 98TH8379), pp. 133-135).*

* cited by examiner

*Primary Examiner* — Shuwang Liu
*Assistant Examiner* — Helene Tayong

(57) ABSTRACT

In accordance with the teachings described herein, system and methods are provided for a GPS acquisition correlation scheme with a reduced memory requirement. An example system may include a memory, a local PRN code generator, correlators, adder trees, an accumulator, and an output memory. The memory may be used to store an input PRN code. The local PRN code generator generates a replica PRN code and outputs a replica PRN code. The local PRN code generator may also shift the replica PRN code for each output epoch. One or more correlators receive the input PRN code and the replica PRN code and compare a bit of the input PRN code to a bit of the replica PRN code and generates a comparison. The adder trees add the comparisons and generate a comparison output. An accumulator accumulates the comparison output and outputs an accumulated output to an output memory.

13 Claims, 8 Drawing Sheets

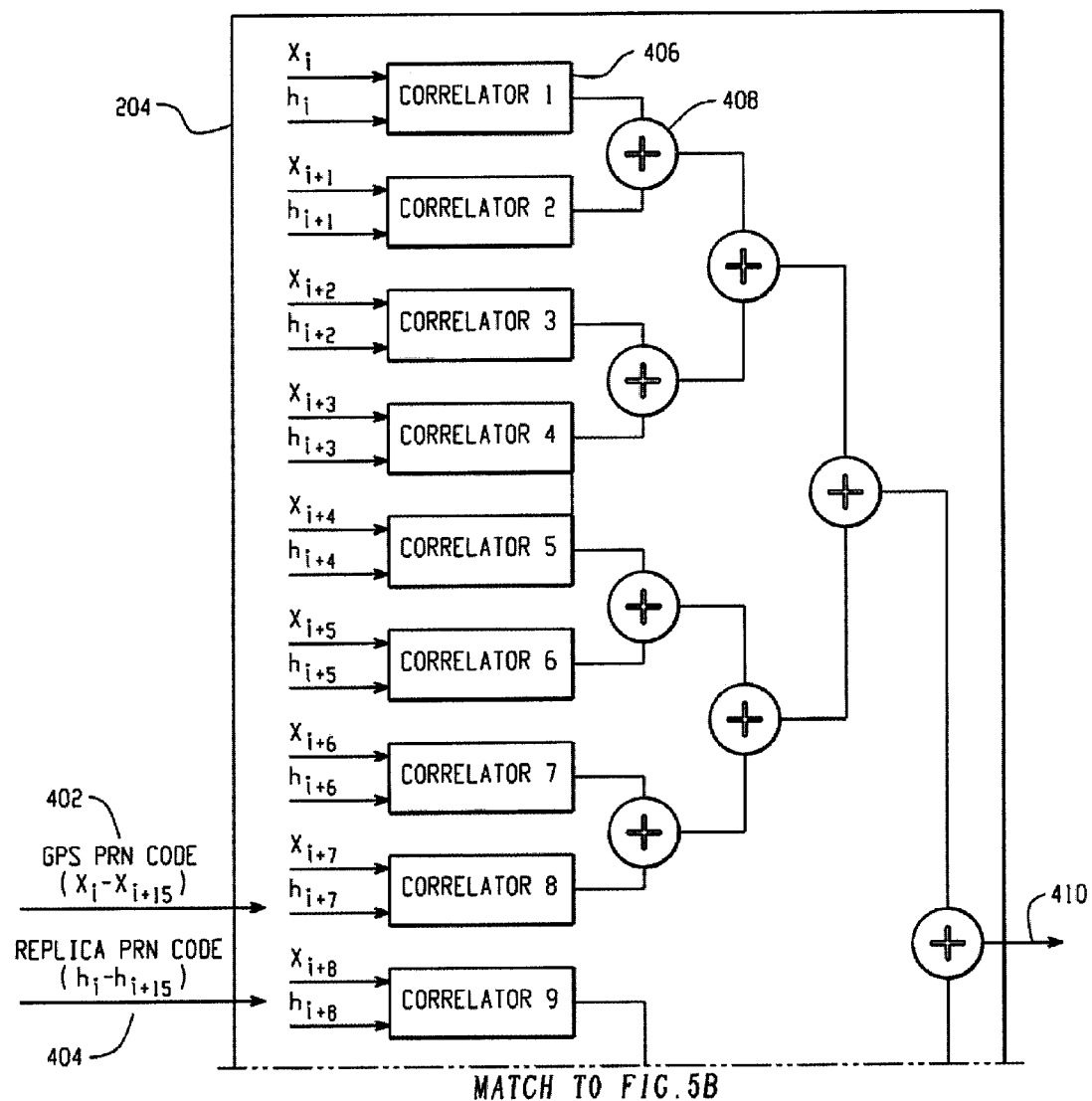

METHOD AND APPARATUS FOR CORRELATING GLOBAL POSITIONING SYSTEM (GPS) PSEUDORANDOM NOISE (PRN) CODES

CROSS-REFERENCE TO RELATED APPLICATIONS

This application claims priority from U.S. Provisional Patent Application No. 61/322,243, filed on Apr. 8, 2010, the entirety of which is incorporated herein by reference.

FIELD

The technology described in this application relates generally to global positioning system (GPS) code processing. More particularly, systems and methods are disclosed for a GPS acquisition correlation scheme with a reduced memory requirement.

BACKGROUND

GPS satellites broadcast signals enabling GPS receivers on the earth's surface to calculate position. GPS satellites transmit data along an L1 frequency and an L2 frequency. The L1 frequency is known as the course acquisition (C/A) code. The C/A code is available for civilian use and is a 1.023 MHz pseudorandom noise (PRN) code, which repeats its 1023 bits each millisecond. Each satellite transmits a unique PRN code so that GPS receivers can identify each satellite based on the PRN code received from a given satellite. 1,023 PRN codes exist, but presently only 32 PRN codes are used—one for each of the 32 GPS satellites in orbit.

FIG. 1a illustrates a typical process for determining position on the earth 14 via GPS. The satellites 10 orbit the earth 14 and constantly transmit PRN codes. Object 12 is located on or near the earth's surface and may include a vehicle, such as an airplane, automobile, motorcycle, ship, or train or a mobile device, such as a cell phone, smartphone, camera, computer, personal navigation device, or video game player. The object 12 is equipped with a GPS receiver that can receive and demodulate incoming GPS signals. In the example shown in FIG. 1a, at least four satellites 10 are used to determine the location of the object 12. The GPS receiver on object 12 utilizes the unique PRN code transmitted by each GPS satellite to determine parameters including (i) which signal the GPS receiver is receiving and (ii) at what time delay the GPS receiver is receiving each signal. With these parameters, the location of the object 12 may be determined.

In order to determine the delay for a received PRN code, a GPS receiver must correlate the received PRN code with its own locally generated copy (or replica) of the PRN code. The correlation process attempts to align the received PRN code with a locally generated replica PRN code, so that the GPS receiver can determine the time delay of the satellite's signal, which is used to calculate position. However, because the receiver does not know the code phase or Doppler information of the satellite signal, the correlation process typically requires thousands of correlations to be performed in order to determine a match.

FIG. 1b demonstrates a typical delay between a received GPS PRN code 20 and a replica PRN code 22. The offset 24 represents the delay that a GPS receiver calculates in order to correlate the replica PRN code 22 with the received GPS PRN code 20. To determine the correct code phase, a receiver typically tries all possible code phases of its replica PRN code 22 to determine a match. This process is typically performed by shifting the replica PRN code 22 through each possible 1,023 bits of code and correlating the replica PRN code 22 with the received GPS PRN code 20 at each shift. The GPS receiver then determines if there is a match after performing each of the correlations.

FIG. 2 illustrates an example of a typical correlation system for a GPS receiver. The correlation system 100 includes a PRN buffer 102, correlators 104, a local PRN code generator 106, accumulators 108, and memories 110. In operation, the correlation system 100 utilizes multiple correlators to compare bits of code from the received GPS PRN code stored in the PRN buffer 102 to bits of code from the replica PRN code produced by the local PRN code generator 106. The output of each correlator is stored in a separate memory 110.

PRN buffer 102 stores the PRN signal from the GPS satellite. In the example of FIG. 2, for each cycle, 1 bit of the GPS PRN code is input to each of the correlators 104. The correlators 104 also receive 64 bits of the replica PRN code from the local PRN code generator 106, with each correlator 104 receiving one bit. Each correlator 104 compares the same bit from the GPS PRN code to one bit from of the replica PRN code and outputs a result to an accumulator 108. In this example, at least 64 different memories 110 are used to store the outputs of the comparisons from the correlators 104.

Assuming the PRN codes are interpolated from 1,023 bits to 2,048 bits, the example of FIG. 2 would require 32 cycles to complete one epoch of replica PRN code. Each cycle produces a comparison of one bit of the GPS PRN code with 64 different bits of the replica PRN code. After one bit of the GPS PRN code has been compared with each bit in the epoch of replica PRN code, the next bit of the GPS PRN code is the input to the correlators 104 and compared with each bit of the replica PRN code. This process repeats until all 2,048 bits of the GPS PRN code have been utilized. The process employed by the correlation system 100 of FIG. 2 requires extensive amounts of memory to complete each correlation. Typically, at least one memory is required for each correlator.

SUMMARY

In accordance with the teachings described herein, system and methods are provided for a GPS acquisition correlation scheme with a reduced memory requirement. An example system may include a memory, a local PRN code generator, correlators, adder trees, an accumulator, and an output memory. The memory may be used to store an input PRN code. The local PRN code generator generates a replica PRN code and outputs a replica PRN code. The local PRN code generator may also shift the replica PRN code for each output epoch. One or more correlators receive the input PRN code and the replica PRN code. Each correlator compares a bit of the input PRN code to a bit of the replica PRN code and generates a comparison. One or more adder trees include one or more adders. The adder trees add the comparisons and generate a comparison output. An accumulator receives the comparison output from the one or more adder trees and accumulates the comparison output. The accumulator outputs an accumulated output to an output memory that stores the accumulated output in a memory address associated with the corresponding epoch of the replica PRN code.

The correlation system may also output the comparison outputs to the memory only when all of the outputs for each epoch of code have been accumulated. The correlation system may also determine an epoch of replica PRN code that is the best correlation to the input PRN code.

A method for correlating GPS PRN codes may include the following steps: receiving, at a GPS receiver, an input PRN code; generating, at the GPS receiver, a replica PRN code; comparing, at the GPS receiver, a segment of an epoch of the input PRN code to a segment of an epoch of the replica PRN code; adding, at the GPS receiver, the comparisons to generate a comparison output; storing, at the GPS receiver, the comparison output in a memory at an address associated with the corresponding epoch of the replica PRN code; and shifting, at the GPS receiver, the replica PRN code and repeating the comparing, adding, and storing steps.

One example system may include a mobile device comprising an antenna, a memory, a local PRN code generator, correlators, adder trees, an accumulator, and an output memory. The memory may be used to store an input PRN code. The local PRN code generator generates a replica PRN code and outputs a replica PRN code. The local PRN code generator may also shift the replica PRN code for each output epoch. One or more correlators receive the input PRN code and the replica PRN code. Each correlator compares a bit of the input PRN code to a bit of the replica PRN code and generates a comparison. One or more adder trees include one or more adders. The adder trees add the comparisons and generate a comparison output. An accumulator receives the comparison output from the one or more adder trees and accumulates the comparison output. The accumulator outputs an accumulated output to an output memory that stores the accumulated output in a memory address associated with the corresponding epoch of the replica PRN code.

Another example system may include a navigation system for a vehicle comprising an antenna, a memory, a local PRN code generator, correlators, adder trees, an accumulator, and an output memory. The memory may be used to store an input PRN code. The local PRN code generator generates a replica PRN code and outputs a replica PRN code. The local PRN code generator may also shift the replica PRN code for each output epoch. One or more correlators receive the input PRN code and the replica PRN code. Each correlator compares a bit of the input PRN code to a bit of the replica PRN code and generates a comparison. One or more adder trees include one or more adders. The adder trees add the comparisons and generate a comparison output. An accumulator receives the comparison output from the one or more adder trees and accumulates the comparison output. The accumulator outputs an accumulated output to an output memory that stores the accumulated output in a memory address associated with the corresponding epoch of the replica PRN code.

BRIEF DESCRIPTION OF THE DRAWINGS

FIGS. 5a and 5b are an example of a correlator block and adder tree.

DETAILED DESCRIPTION

Figure 3:
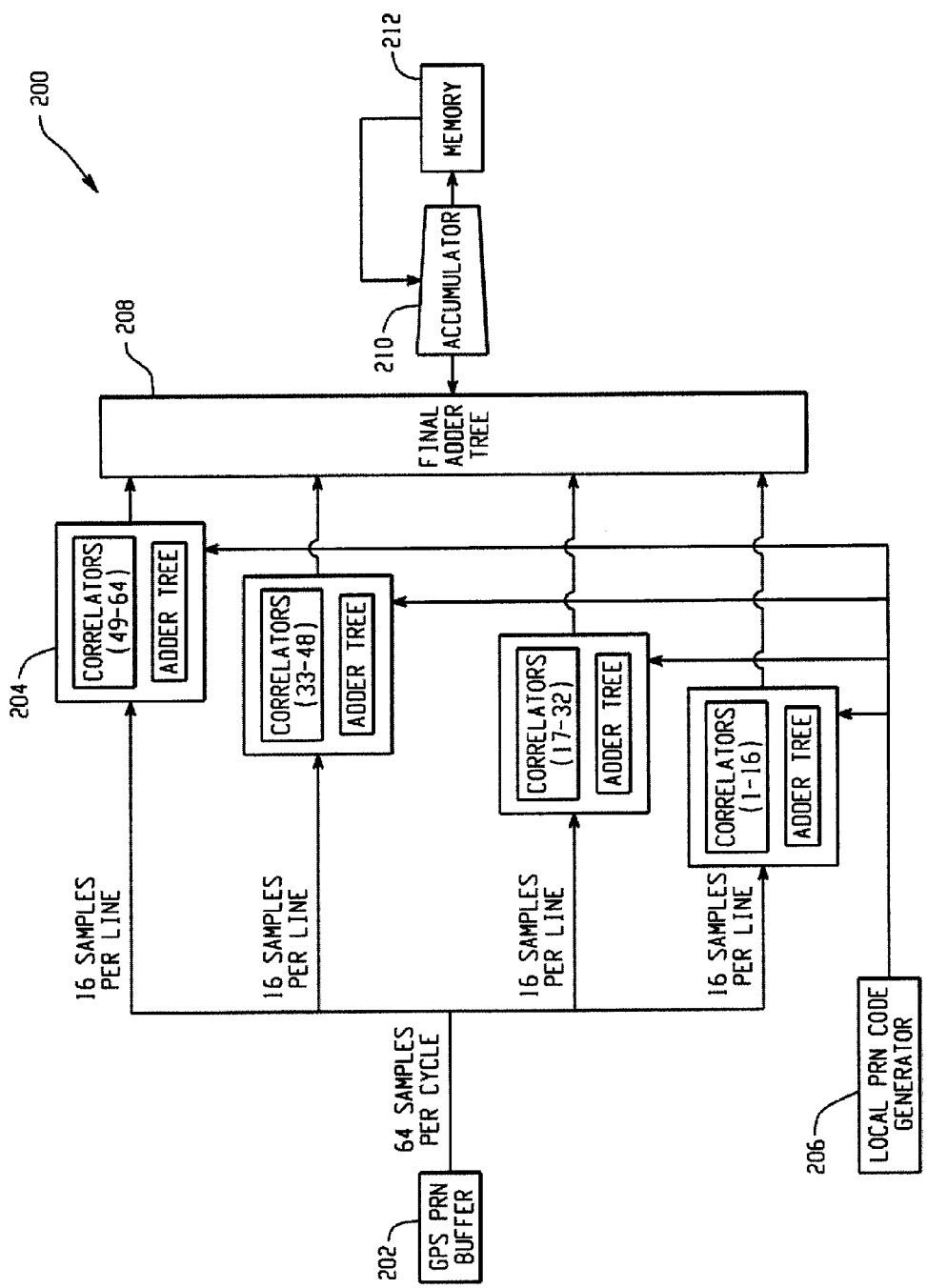
FIG. 3 is a block diagram of an example correlation system for correlating GPS PRN codes with reduced memory requirements.

FIG. 3 is a block diagram of an example correlation system 200 for correlating GPS PRN codes. The correlation system 200 illustrated in FIG. 3 utilizes multiple adder trees to reduce the memory space required to perform correlations of PRN codes. In the example provided in FIG. 3, only one output per cycle is produced and thus, only one memory block may be required.

The correlation system 200 includes a GPS PRN buffer 202, correlator blocks 204, a local PRN code generator 206, a final adder tree 208, an accumulator 210, and a memory 212. The GPS PRN buffer 202 is configured to store accumulated GPS PRN codes, which may have undergone any initial processing following reception from the satellite, such as interpolation. In the example provided in FIG. 3, the PRN codes are interpolated to 2,048 bits at a sample rate of 2 MHz. Depending on a chosen sample size per cycle, the GPS PRN buffer 202 may be configured to output a certain segment of the GPS PRN code to the correlator blocks 204. In the example provided in FIG. 3, the GPS PRN buffer 202 is configured to provide a segment of 64 sample bits per cycle. Because the GPS PRN signal is 2048 bits, 32 cycles must be completed to produce an entire epoch of GPS PRN code to the correlator blocks 204. Other configurations may be employed, however, and the correlation system 200 is not limited to a segment length of 64 bits. For example, the correlation system 200 may also be configured to process segments of 128 sample bits. Processing a sample of 128 bits would accordingly only require 16 cycles to complete each epoch of PRN code. However, because more bits are processed in each cycle, the number of correlator blocks in the correlation system 200 would correspondingly increase.

Local PRN code generator 206 generates a replica PRN code of the GPS PRN code stored in the GPS PRN buffer 202. In the example of FIG. 3, the local PRN code generator 206 is configured to output a 64 bit sample segment of each PRN code epoch to match the 64 bit sample segment output by the GPS PRN buffer 202. Accordingly, each correlator block 204 is configured to receive 16 sample bits of the replica PRN code.

The local PRN code generator 206 is configured to output different sample segments from each epoch of code for each of the 32 cycles. Generating a different sample segment for each cycle allows for all segments from the epoch of code to be output to the correlators 204 over the 32 cycle period. The GPS PRN buffer 202 is also configured to generate a different sample segment for each cycle. As described below with reference to FIG. 4, the segments generated each cycle by both the GPS PRN buffer 202 and the local PRN code generator 206 correspond to a predetermined segment of code.

For each subsequent period of 32 cycles, the local PRN code generator 206 is configured to shift the local PRN code. In the example correlation system 200 of FIG. 3, this process may be repeated until the local PRN code has been shifted across the entire epoch.

Each correlator block 204 may include one or more correlators and adders. An example correlator block is described in detail below in FIGS. 5a and 5b. In the example of FIG. 3, each correlator block 204 contains 16 correlators to compare each of the 16 sample bits received from the PRN buffer to the 16 sample bits received from the local PRN code generator 206. Because each correlator block 204 in this example includes 16 correlators, an adder tree is configured to add the 16 outputs of each correlator in the correlator block 204 and generate one output. The final adder tree 208 receives the output from each correlator block 204 and adds the outputs to produce one added signal to the accumulator 210.

Figure 1A:
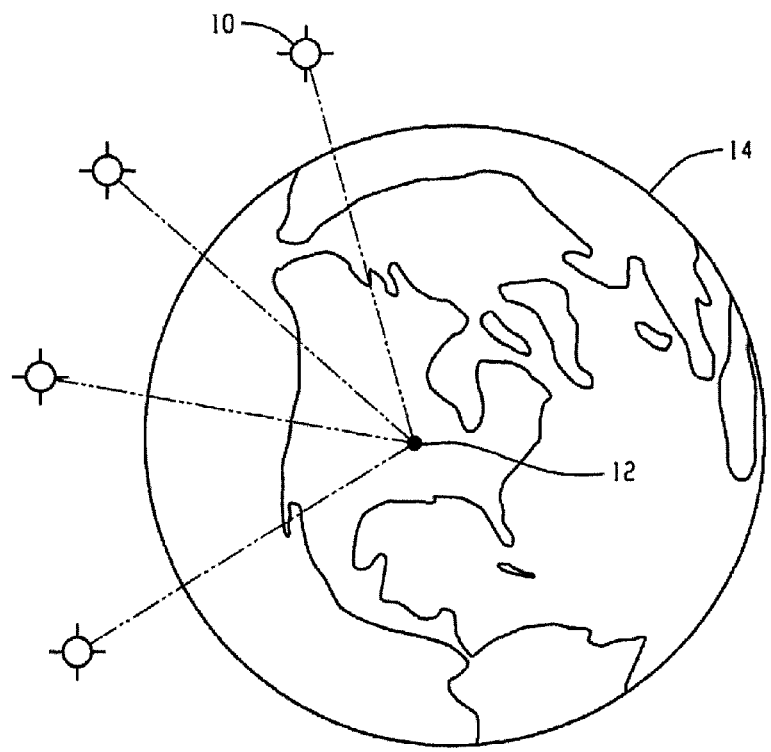
FIGS. 1a and 1b illustrate a typical process for determining position on the earth via GPS satellites.
Figure 1B:
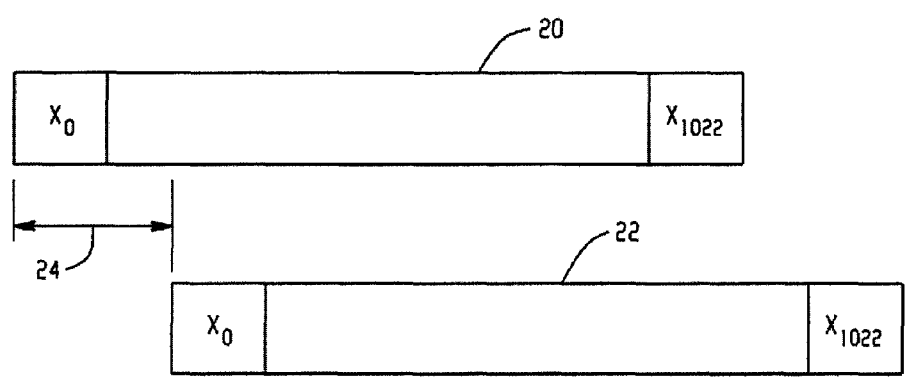
Figure 2:
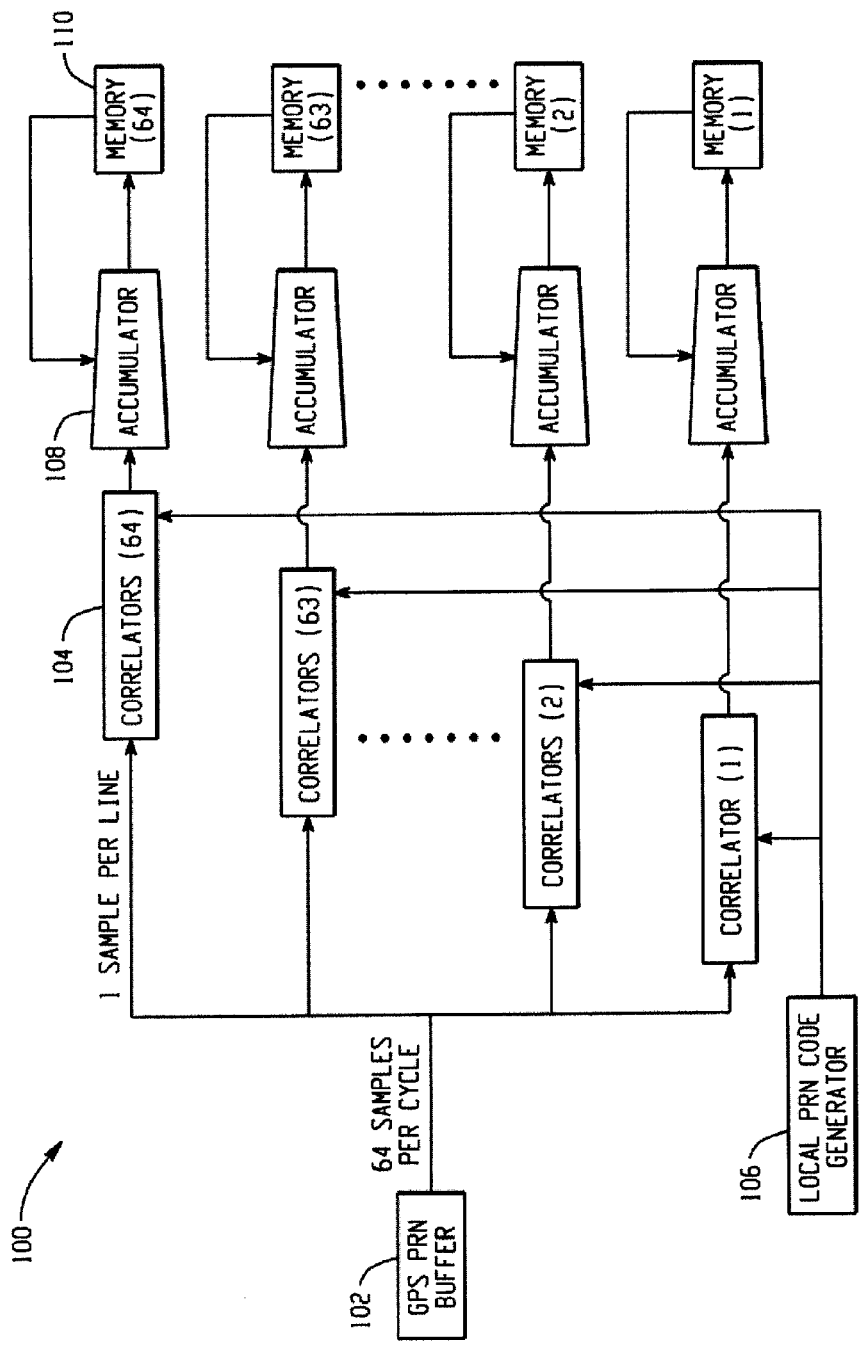
FIG. 2 illustrates a typical prior art correlation system for a GPS receiver.

The example correlation system 200 in FIG. 3 requires 32 cycles to complete each epoch of code. The accumulator 210, therefore, is configured to accumulate the output from the final adder tree 208 for each of the 32 cycles. After accumulating the outputs from the final adder tree 208, the accumulator 210 is configured to store the accumulated output in the memory 212. In contrast to the correlation system provided in FIG. 2, which requires one memory for each correlator, the example in FIG. 3 requires only one memory to store the comparison output for an entire correlation of an epoch of PRN code.

Figure 4:
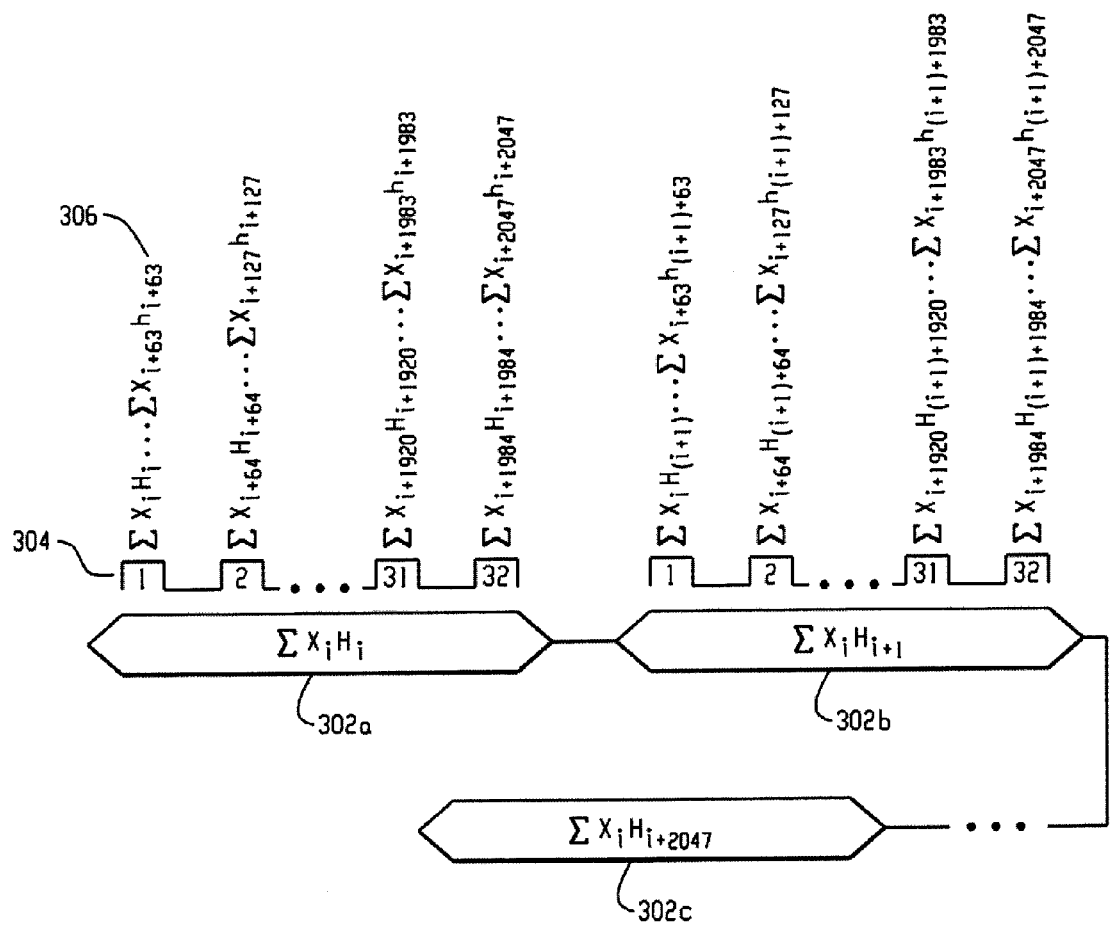
FIG. 4 illustrates an example process for processing segments of PRN code in a GPS receiver.

FIG. 4 provides an example of the correlation process illustrated in FIG. 3 for each cycle of the correlation system. In this example, each epoch of the replica PRN code, e.g., 302a and 302b, requires 32 cycles 304 to perform a correlation of the entire epoch. Epoch 302a represents the correlation between $X_i$ and $H_i$. $X_i$ represents the GPS PRN code at its initial start value $X_0$, whereas $H_i$ represents the replica PRN code at its initial start value, $H_0$. For each subsequent epoch of code, the initial start value of the replica PRN code is shifted by one bit. Accordingly, epoch 302b includes an initial replica PRN code starting value of $H_{i+1}$.

In the example provided in FIG. 4, epoch 302a requires 32 cycles 304 of 64 bits each to perform an entire correlation of the 2048 bit code. Beginning at cycle number 1, the input PRN codes 306 are the first 64 bits from both the GPS PRN code and the replica PRN code. Each subsequent cycle 304 processes the next 64 bits from each code. Upon reaching the final cycle 304 in the first epoch 302a, the final bits from each epoch, bits 2047, are processed. This process repeats into epoch 302b and continues until the replica PRN code has been shifted 2047 times at epoch 302c ($H_{i+2047}$).

Figure 5B:
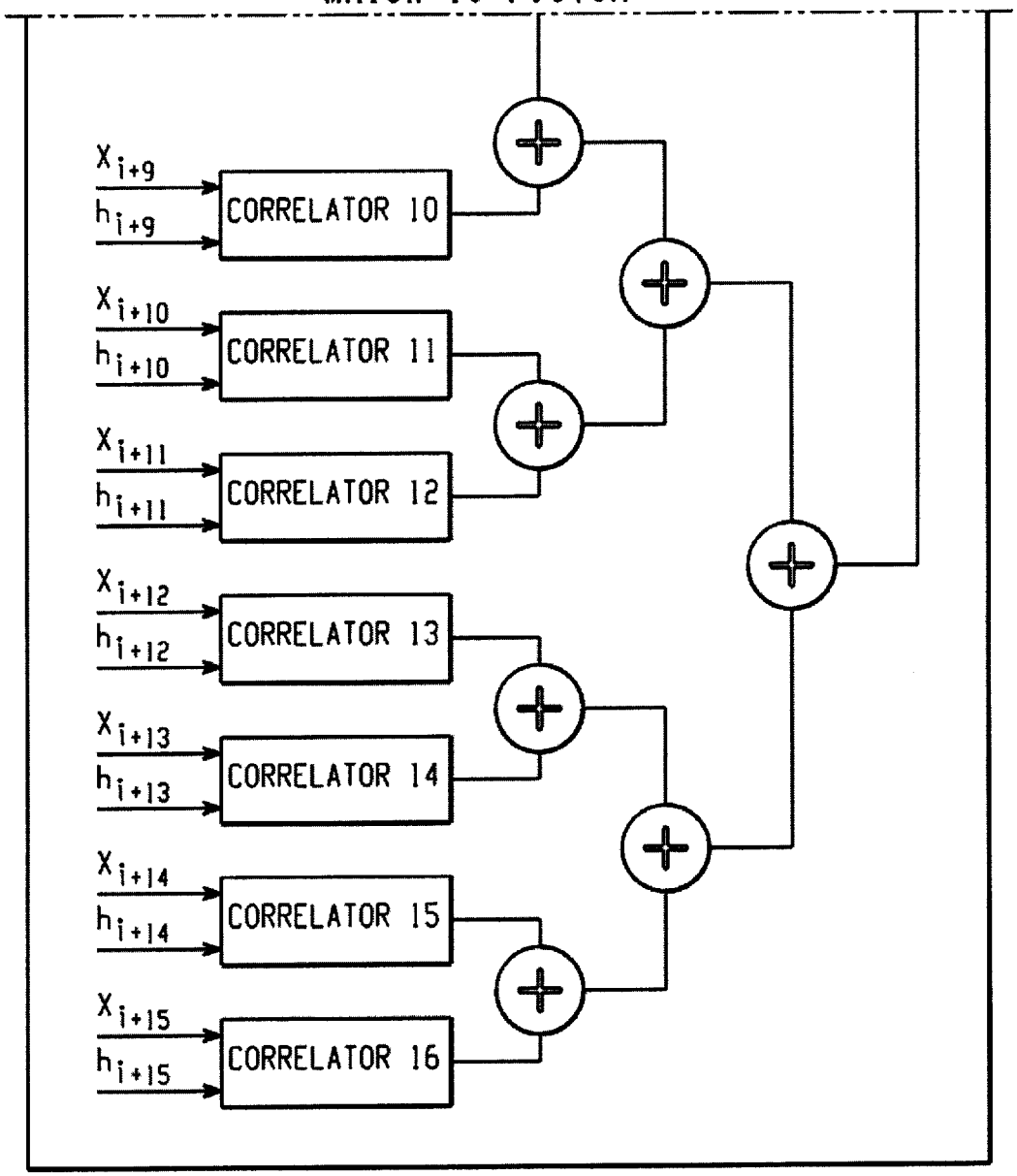

An example of a correlator block 204 is provided in FIGS. 5a and 5b. Each correlator block 204 includes an input for GPS PRN code 402, an input for replica PRN code 404, correlators 406, adders 408, and an output 410. Each input 402 and 404 includes 16 bits of each code. One bit from each input goes to the respective correlator 406. For example, the $x_{i+4}$ bit would go to the same correlator as the $h_{i+4}$ bit. Once each correlator 406 compares its sample bits, the output is fed to an adder 408. The adders 408 form an adder tree, which is a grouping of individual adders configured to receive multiple inputs and output a single value. In the example correlator block 204 of FIGS. 5a and 5b, output 410 is the single output of the adder tree. As described in reference to FIG. 2, the output 410 is received by a final adder tree, which outputs one value to an accumulator.

Figure 6:
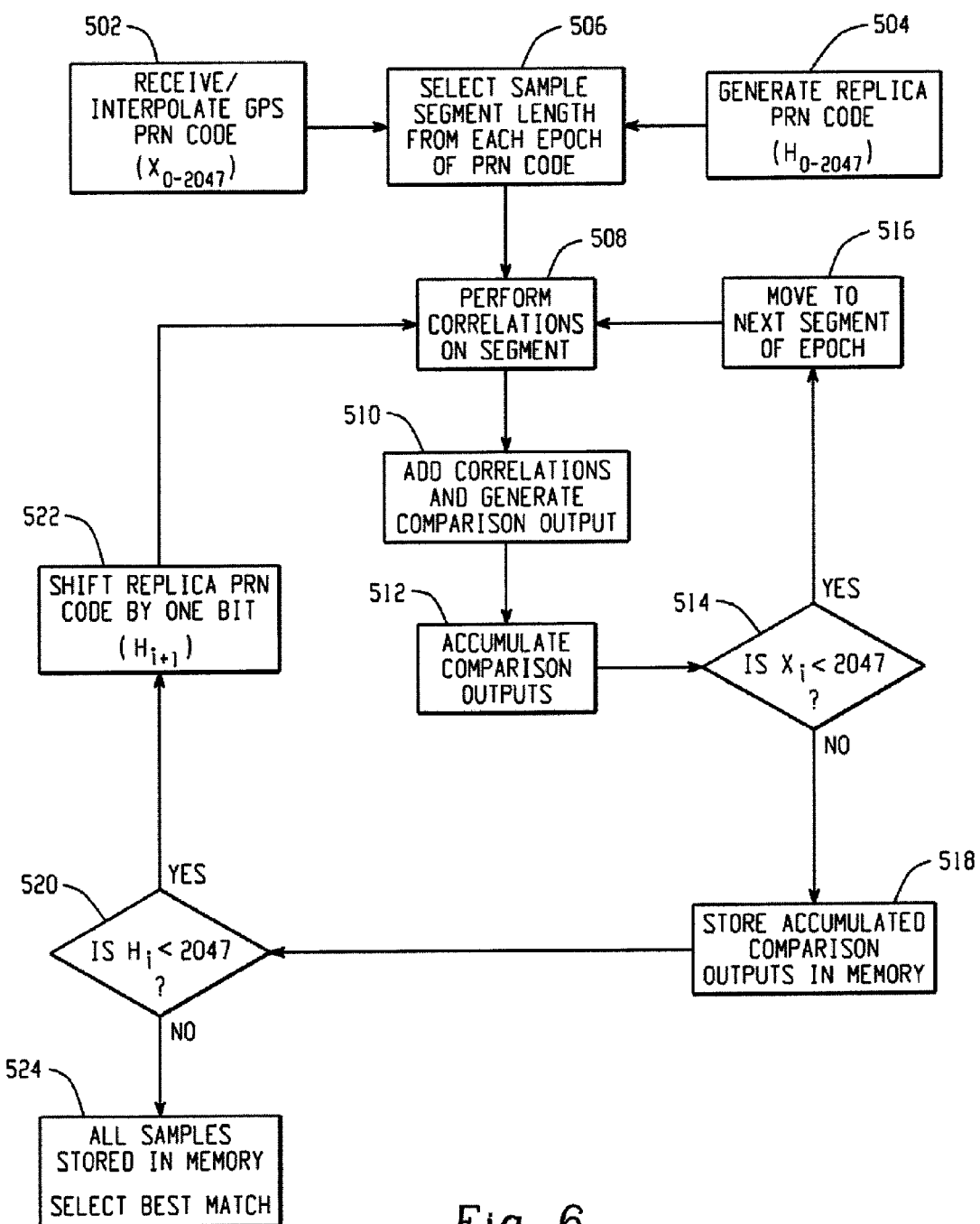
FIG. 6 is a flow diagram illustrating an example method of correlating GPS PRN codes with reduced memory requirements.

FIG. 6 is a flow diagram illustrating an example method of correlating GPS PRN codes. At step 502, a GPS receiver receives GPS PRN code from a satellite. The GPS PRN code is then interpolated at a predetermined sample rate. For the example illustrated in FIG. 6, the GPS PRN code is interpolated to 2,048 bits. The interpolated GPS PRN code is then stored in a memory or buffer.

In step 504, a local PRN code generator produces a replica PRN code. The replica PRN code corresponds to the GPS PRN code received at step 502 and contains the same number of bits as the interpolated GPS PRN code.

At step 506, a segment of both the interpolated GPS PRN code and the replica PRN code is selected. One bit of each code segment is sent to each correlator for a comparison in step 508. In this example, the number of correlators should equal the number of bits in each segment of code. Step 510 receives the output from each correlator, and an adder tree comprised of one or more adders adds the outputs from each correlator. The addition of the correlator outputs produces only one output per cycle. This output from the adder tree is received by an accumulator in step 512. The accumulator in step 512 accumulates the output from each cycle until an entire epoch of code has been processed.

Whether an entire epoch of code has been processed is determined at step 514. Independent of the number of bits in each segment at step 506, an entire epoch of code is processed after bit $X_{2047}$. Accordingly, step 514 determines whether bit $X_{2047}$ has been processed. If the last bit of the GPS PRN code segment is less than $X_{2047}$, then the process selects the next segment of code from both the GPS PRN code and from the replica PRN code. Steps 508-514 are then repeated until $X_{2047}$ has been processed.

Once $X_{2047}$ has been processed, the accumulator outputs all accumulated outputs to a memory at step 518. After the accumulated outputs are stored in memory, the process in FIG. 6 determines, in step 520, whether the replica PRN code has been shifted at each bit. Because there are 2048 total bits ($H_0$-$H_{2047}$) of the replica PRN code, if the starting bit of the replica code sequence is less than bit $H_{2047}$, all of the possible shifts of the replica PRN code have not been processed. To continue processing all possible shifts, at step 522 the replica PRN code is shifted to the next bit, and the process repeats starting at step 508. In the example of FIG. 6, only when the replica PRN code has been shifted through the entire epoch of code are all of the comparisons stored in memory. Once all of the comparisons of the GPS PRN code to the replica PRN code have been stored, the process can determine the offset of the replica PRN code that correlates to the GPS PRN code.

Figure 7A:
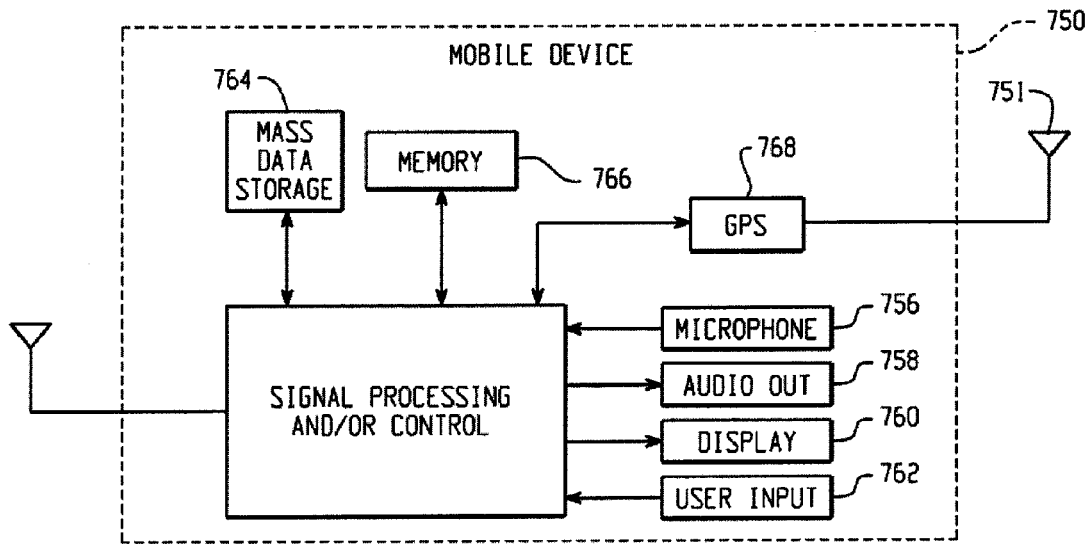
FIGS. 7a and 7b are example implementations of the correlation system.
Figure 7B:
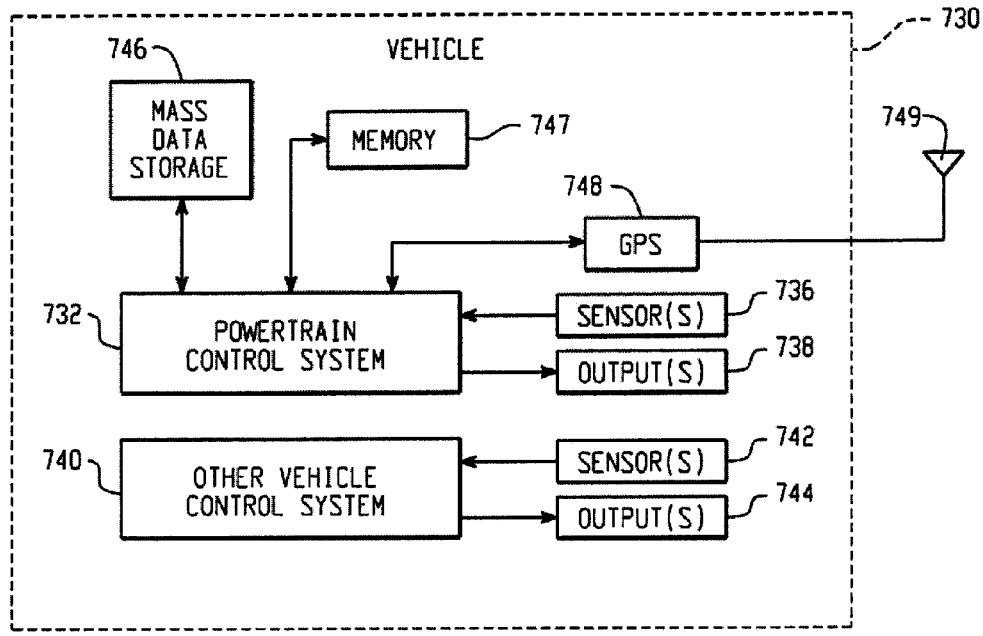

Referring now to FIGS. 7a and 7b, various exemplary implementations of the present invention correlation system are shown. With reference to FIG. 7a, the correlation system may be embodied in a mobile device 750 that may include an antenna 751. The correlation system may implement either or both signal processing and/or control circuits, which are generally identified in FIG. 7a at 752, a GPS receiver and/or mass data storage 764 of the mobile device 750. In some implementations, mobile device 750 includes a microphone 756, an audio output 758 such as a speaker and/or audio output jack, a display 760 and/or an input device 762 such as a keypad, pointing device, voice actuation and/or other input device. Signal processing and/or control circuits 752 and/or other circuits (not shown) in mobile device 750 may process data, perform coding and/or encryption, perform calculations, format data and/or perform other cellular phone functions.

Mobile device 750 may communicate with mass data storage 764 that stores data in a nonvolatile manner such as optical and/or magnetic storage devices for example hard disk drives HDD and/or DVDs. The HDD may be a mini HDD that includes one or more platters having a diameter that is smaller than approximately 1.8". Mobile device 750 may be connected to memory 766 such as RAM, ROM, low latency nonvolatile memory such as flash memory and/or other suitable electronic data storage. Mobile device 750 also may support connections with a GPS receiver 768.

Referring now to FIG. 7b, the present invention correlation system implements a control system of a vehicle 730, a GPS receiver and/or mass data storage of the vehicle control system. In some implementations, the correlation system implements a control system 732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. In some implementations, control system 740 may be a navigation system, a telematics system, a vehicle telematics system, a lane departure system, an adaptive cruise control system, a vehicle entertainment system such as a stereo, DVD, compact disc and the like. Still other implementations are contemplated.

Control system 732 may communicate with mass data storage 746 that stores data in a nonvolatile manner. Mass data storage 746 may include optical and/or magnetic storage devices for example hard disk drives HDD and/or DVDs. The HDD may be a mini HDD that includes one or more platters having a diameter that is smaller than approximately 1.8". Control system 732 may be connected to memory 747 such as RAM, ROM, low latency nonvolatile memory such as flash memory and/or other suitable electronic data storage. Control system 732 also may support connections with a GPS receiver 748, which receives GPS signals through an antenna 749. The control system 740 may also include mass data storage, memory and/or a WLAN interface (all not shown).

This written description uses examples to disclose the invention, include the best mode, and also to enable a person skilled in the art to make and use the invention. The patentable scope of the invention may include other examples that occur to those skilled in the art.

The invention claimed is:

1. A global positioning system (GPS) receiver, comprising:
    an input memory configured to store an input pseudorandom noise (PRN) code;
    a local PRN code generator configured to generate a replica PRN code, the local PRN code generator outputting the replica PRN code and shifting the replica PRN code, wherein the replica PRN code includes an epoch of code with a sequence length of a number of bits; and
    a correlation system including:
        x correlator blocks, wherein x is greater than one, and wherein each of the x correlator blocks includes:
            a first input for receiving the input PRN code,
            a second input for receiving the replica PRN code,
            a plurality of correlators, wherein a same number of the correlators are included in each of the x correlator blocks, and wherein each of the correlators is configured to compare a bit of the input PRN code to a bit of the replica PRN code to generate a comparison value; and
            an adder tree, comprising a single adder tree of one or more adder trees, configured to add the comparison values respectively generated by the plurality of correlators and generate an output based on the addition of the comparison values;
        a final adder tree with x inputs configured to receive the outputs of the adder trees of the x correlator blocks, wherein the final adder tree is configured to add the x outputs to generate a comparison output;
        a single accumulator configured to receive the comparison output and accumulate the comparison output, wherein the single accumulator is configured to output a single accumulated output for the epoch of code only after all comparison outputs for the epoch of code have been accumulated; and
        an output memory configured to receive and store the single accumulated output, wherein the output memory is a single memory.

2. The GPS receiver of claim 1, wherein the GPS receiver is further configured to determine an epoch of replica PRN code that correlates best to the input PRN code.

3. The GPS receiver of claim 1, wherein the replica PRN code is 2,048 bits.

4. The GPS receiver of claim 1, wherein a total number of segments of the replica PRN code equals a total number of cycles required to process the epoch of code.

5. The GPS receiver of claim 1, wherein the input memory is a buffer.

6. The GPS receiver of claim 1, wherein the GPS receiver is part of a navigation unit of a vehicle.

7. A navigation system for a vehicle, the navigation system comprising:
    an antenna; and
    the GPS receiver of claim 1, wherein the GPS receiver is in communication with the antenna.

8. The GPS receiver of claim 1, further comprising:
    a PRN buffer configured to output a segment of the input PRN code to the x correlator blocks, wherein the input PRN code comprises y segments, wherein y is greater than one, wherein the single accumulator outputs the single accumulated output after y cycles, and wherein all comparison outputs for the epoch of code are accumulated at a completion of the y cycles.

9. A mobile device, comprising:
    an antenna;
    a receiver, coupled to the antenna, configured to receive an input pseudorandom noise (PRN) code;
    an input memory configured to store the input PRN code;
    a local PRN code generator configured to generate a replica PRN code, the local PRN code generator outputting the replica PRN code and shifting the replica PRN code, wherein the replica PRN code includes an epoch of code with a sequence length of a number of bits; and
    a correlation system including:
        x correlator blocks, wherein x is greater than one, and wherein each of the x correlator blocks includes:
            a first input for receiving the input PRN code,
            a second input for receiving the replica PRN code,
            a plurality of correlators, wherein a same number of the correlators are included in each of the x correlator blocks, and wherein each of the correlators is configured to compare a bit of the input PRN code to a bit of the replica PRN code to generate a comparison value; and
            an adder tree, comprising a single adder tree of one or more adder trees, configured to add the comparison values respectively generated by the plurality of correlators and generate an output based on the addition of the comparison values;
        a final adder tree with x inputs configured to receive the outputs of the adder trees of the x correlator blocks, wherein the final adder tree is configured to add the x outputs to generate a comparison output;
        a single accumulator configured to receive the comparison output and accumulate the comparison output, wherein the single accumulator is configured to output a single accumulated output for the epoch of code only after all comparison outputs for the epoch of code have been accumulated; and
        an output memory configured to receive and store the single accumulated output, wherein the output memory is a single memory.

10. The mobile device of claim 9, wherein the receiver is further configured to determine an epoch of replica PRN code that correlates best to the input PRN code.

11. The mobile device of claim 9, wherein the replica PRN code is 2,048 bits.

12. The mobile device of claim 9, wherein the total number of segments of the replica PRN code equals the total number of cycles required to process the epoch of code.

13. The mobile device of claim 9, further comprising:
    a PRN buffer configured to output a segment of the input PRN code to the x correlator blocks, wherein the input PRN code comprises y segments, wherein y is greater than one, wherein the single accumulator outputs the single accumulated output after y cycles, and wherein all comparison outputs for the epoch of code are accumulated at a completion of the y cycles.

* * * * *